United States Patent
Acedo et al.

(10) Patent No.: US 8,429,373 B2
(45) Date of Patent: Apr. 23, 2013

(54) METHOD FOR IMPLEMENTING ON DEMAND CONFIGURATION CHANGES

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Tucson, AZ (US); Matthew John Ward, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 12/503,751

(22) Filed: Jul. 15, 2009

(65) Prior Publication Data

US 2011/0016287 A1    Jan. 20, 2011

(51) Int. Cl.
 G06F 12/00    (2006.01)
 G06F 13/00    (2006.01)

(52) U.S. Cl.
 USPC .............. 711/172; 711/10; 711/154; 711/200

(58) Field of Classification Search .................. 711/100, 711/154, 172, 200
 See application file for complete search history.

(56) References Cited

U.S. PATENT DOCUMENTS

| 6,836,819 B2* | 12/2004 | Kano et al. .................... 711/112 |
| 6,915,518 B1 | 7/2005 | Jacobson |
| 7,146,590 B1 | 12/2006 | Chaudhary |
| 7,292,070 B1 | 11/2007 | Park et al. |
| 7,295,036 B1 | 11/2007 | Zaveri et al. |
| 7,447,832 B2* | 11/2008 | Kano et al. ..................... 711/112 |
| 8,127,093 B2* | 2/2012 | Asano et al. .................. 711/161 |
| 2003/0009619 A1 | 1/2003 | Kano et al. |

FOREIGN PATENT DOCUMENTS

CN    1916874    2/2007

OTHER PUBLICATIONS

Chinese Patent Office Action dated Dec. 23, 2011.
Chinese Office Action dated Sep. 5, 2012.

* cited by examiner

*Primary Examiner* — Tuan V. Thai
(74) *Attorney, Agent, or Firm* — Dale F. Regelman; Quarles & Brady LLP

(57) ABSTRACT

A method for implementing on-demand configuration of a logical volume, wherein the method monitors the amount of available storage capacity of the logical storage volume and determines whether the available storage capacity exceeds a predetermined threshold, such as a percentage of available logical storage space. If the method determines that the storage capacity of the logical storage volume is nearing full capacity, the method determines whether configured physical storage space is available. If the method determines that configured physical storage space is available, the method then reconfigures the logical storage volume to include the configured physical storage space. If configured physical storage space is not available, the method locates unconfigured physical storage space, configures the available physical storage space, and reconfigures the logical volume using the configured physical storage space.

17 Claims, 3 Drawing Sheets

METHOD FOR IMPLEMENTING ON DEMAND CONFIGURATION CHANGES

FIELD OF THE INVENTION

The invention relates to methods and systems for on-demand configuration of logical storage volumes.

BACKGROUND OF THE INVENTION

When a volume within a storage subsystem runs out of space, the host using the volume will need additional storage to continue I/O operations. The conventional method of manually configuring storage space by creating and assigning a new volume to the host or increasing the capacity of an existing volume is time consuming and risks causing significant downtime.

Aside from manual configuration, another technique sometimes used is called thin provisioning. With thin provisioning, a user can create a volume specifying a size but physical storage is only allocated to the volume as data is written. However, once the allocated capacity reaches the originally requested capacity for the volume, no more data can be written to the volume until it is re-sized, thus resulting in the need to manually add capacity to the volume.

SUMMARY OF THE INVENTION

A method for implementing on-demand configuration of a logical storage volume is provided. The method monitors the available storage capacity of a logical volume, and compares an actual logical volume utilization with a logical volume utilization threshold (such as a percentage of available logical storage space). If the actual logical volume utilization is greater than the logical volume utilization threshold, the method determines whether configured, physical storage space is available. If configured physical storage space is available, the method then reconfigures the logical volume to include the configured physical storage space.

If configured physical storage space is not available, the method locates unconfigured physical storage space, configures the available physical storage space, and reconfigures the logical volume using the configured physical storage space. If unconfigured physical space is not available, the method provides notice that a physical storage space limitation has been reached.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
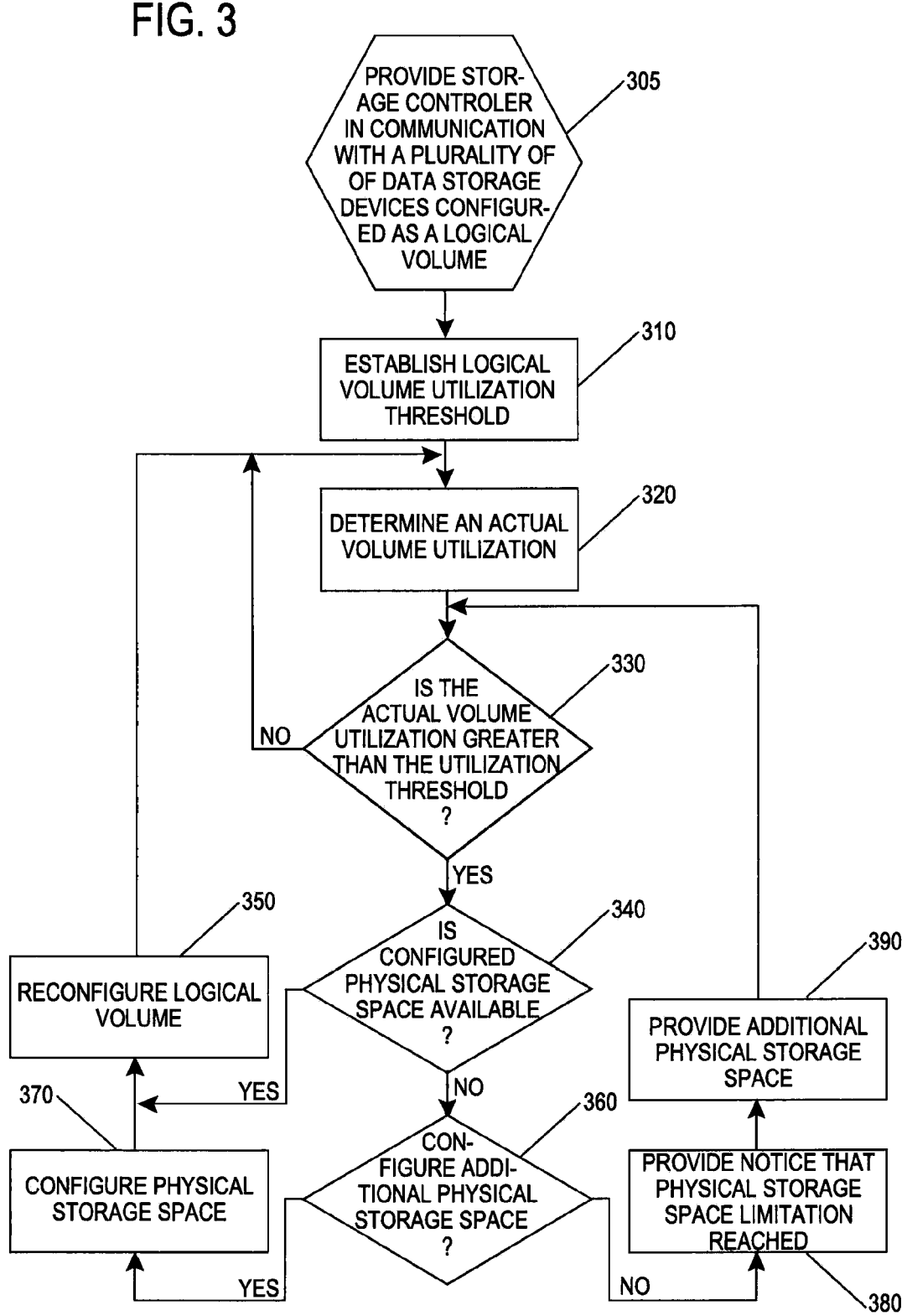
FIG. 3 is a flow chart summarizing certain steps in Applicants' method to for implementing on-demand configuration of a logical storage volume

The schematic flow chart diagram included is generally set forth as a logical flow-chart diagram (e.g., FIG. 3). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 4). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
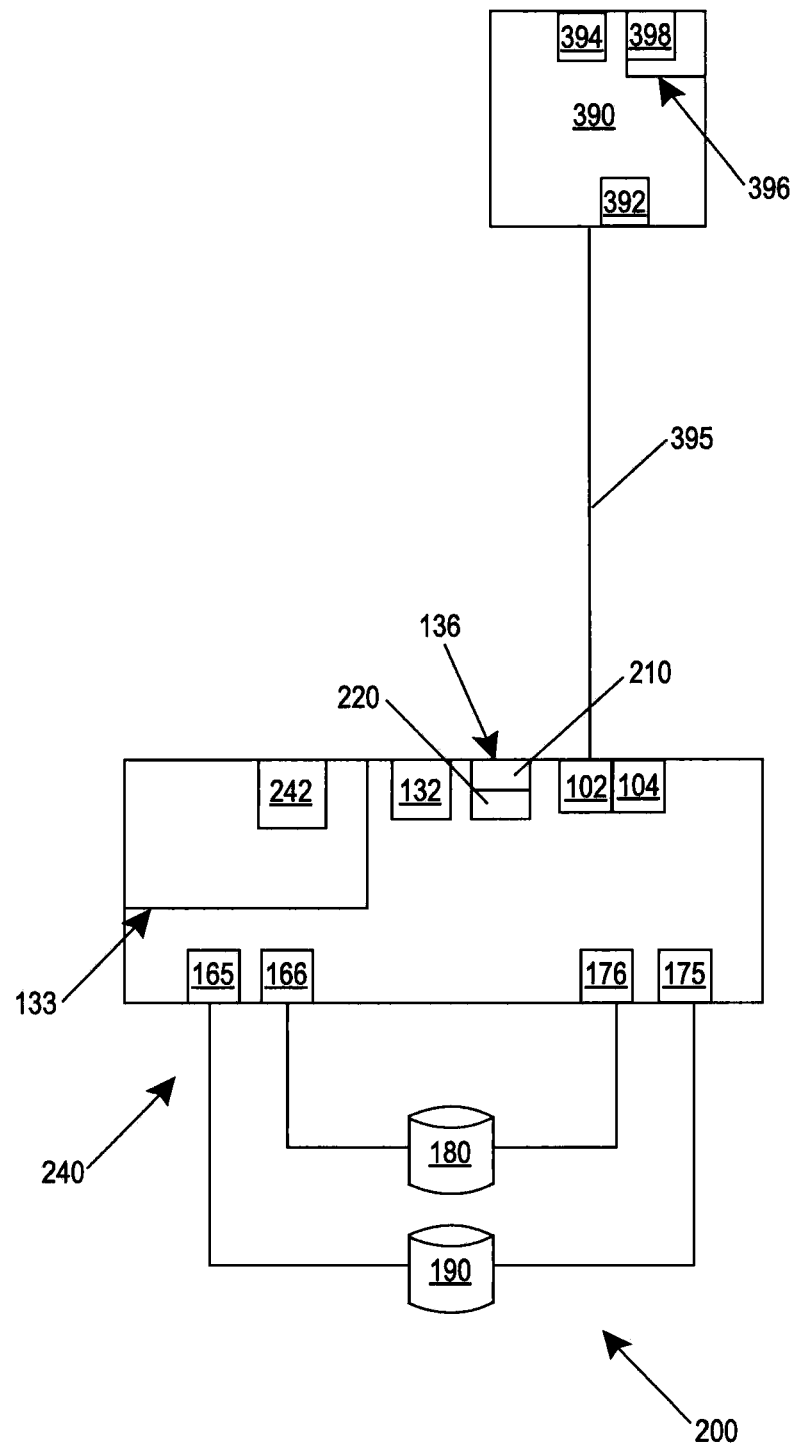
FIG. 2 is a block diagram showing a host computer in communication with a storage controller.

Referring to FIG. 2, data storage system 200 includes storage controller 240 which interconnects a plurality of data storage drives 180 and/or a plurality of data storage drives 190, with a computing device 390. Storage controller 240 comprises a processor 132 and memory 133, and computer readable program code 242 written to memory 132. Storage controller further comprises non-volatile storage ("NVS") 136. In certain embodiments, NVS 136 comprises a track buffer portion 210 and a segments portion 220.

In certain embodiments, storage controller 240 communicates with the plurality of data storage devices 180 via device adapters 165 and 175, and with plurality of data storage devices 190 via device adapters 166 and 176, using an I/O protocol selected from the group consisting of SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

In the illustrated embodiment of FIG. 2, host computer 390 comprises a processor 394 and computer readable medium 396, wherein instructions 398 are encoded in computer readable medium 396. In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiments of FIG. 2, host computer 390 comprises channel path identifier (CHPid) 392. CHPid 392 is interconnected to host adapter 102 disposed in storage controller 240 via communication link 395. The illustrated embodiment of FIG. 2 shows host computer 390 interconnected with storage controller 240 via one communication link.

Figure 1:
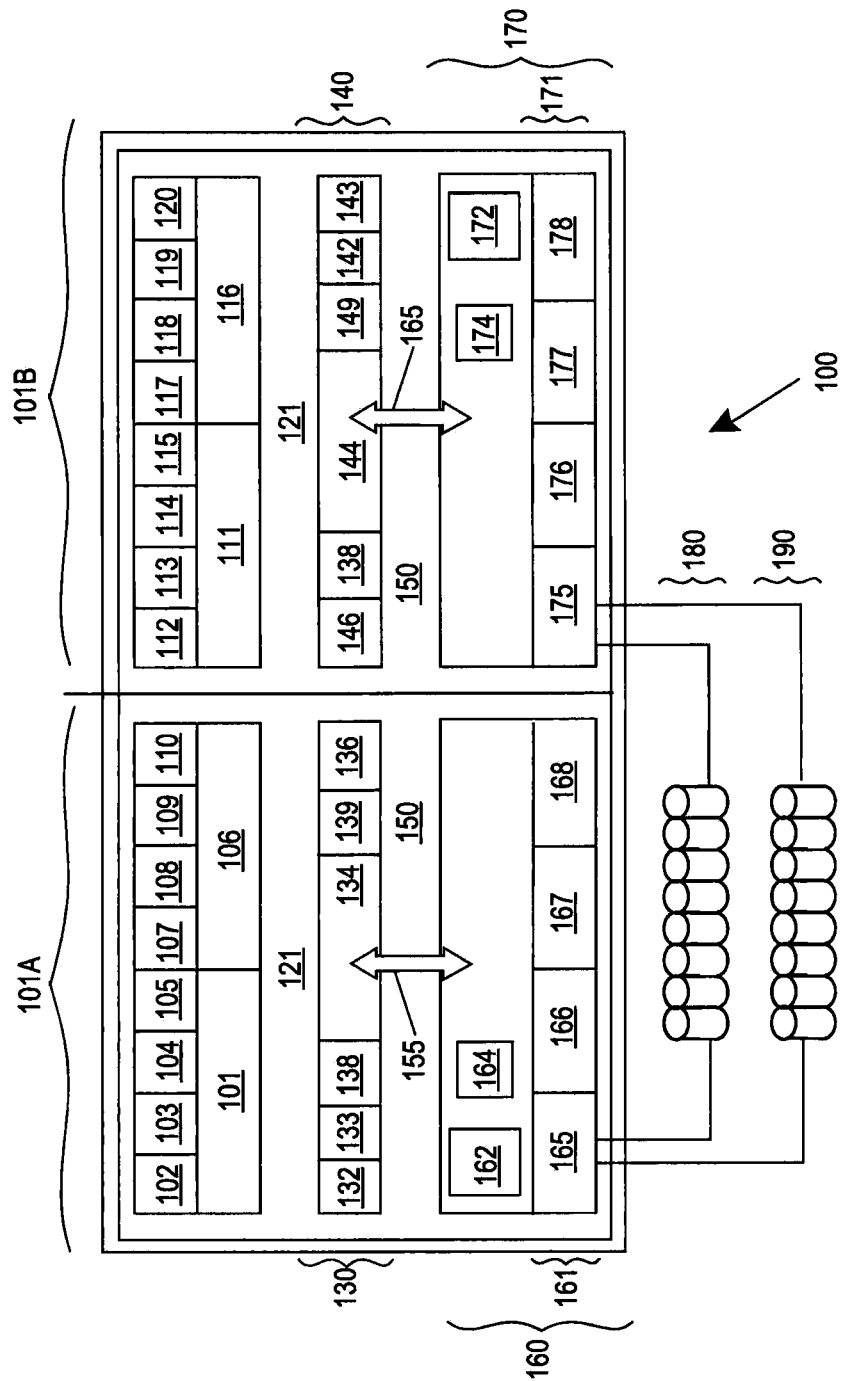
FIG. 1 is a block diagram showing the elements of a host computer.

Referring now to FIG. 1, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 1, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may include one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 133, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen data storage devices are organized into two arrays. In other embodiments, the data storage system includes more than two storage device arrays. In certain embodiments, each storage array appears to a host computer as one or more logical volumes.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

FIG. 3 summarizes the steps of Applicants' method for implementing on-demand configuration of a logical storage volume. The logical storage volume can be implemented using any type of underlying physical storage, including magnetic disc, optical disc, tape, virtual tape server, holographic-based storage, etc. Preferably, Applicants method is executed on a storage subsystem and can access a list of available logical volumes to monitor and a predetermined threshold value for each logical volume indicative of the point at which the logical volume is to be considered nearing full storage capacity. Applicants' method can also be implemented on a host computer system (or partly on a host system and partly on a storage subsystem).

Referring now to FIG. 3, in step 305 the method provides a storage controller in communication with a plurality of data storage devices, i.e. physical storage space, configured as a logical volume. In certain embodiments, the storage controller of step 305 is in communication with a plurality of data storage devices configured as a plurality of logical volume, wherein Applicants' method can be implemented separately for each logical volume.

In step 310 the method sets a logical volume utilization threshold for the logical volume of step 310. In certain embodiments, step 305 is performed by a storage services provider. In certain embodiments, step 310 is performed by a storage controller, such as storage controller 100 (FIG. 1) or storage controller 240 (FIG. 2). In certain embodiments, step 310 is performed by a host computer in communication with the logical storage volume.

In certain embodiments, the threshold volume usage of step 310 comprises a percentage of the nominal storage capacity of the logical storage volume. In certain embodiments, the threshold volume usage of step 310 comprises a specified storage level, i.e. 1 gigabyte ("GB").

In step 320, Applicants' method determines an actual logical volume utilization for the logical volume of step 305. In certain embodiments, the determination of step 320 is performed via polling of the logical volume at one or more specified time intervals. In other embodiments, the determination of step 320 results when a certain event occurs indicating that the logical volume is reaching full capacity. In certain embodiments, step 320 is performed by a storage services provider. In certain embodiments, step 320 is performed by a storage controller, such as storage controller 100 (FIG. 1) or storage controller 240 (FIG. 2). In certain embodiments, step 320 is performed by a host computer in communication with the logical storage volume.

In step 330, Applicants' method determines whether the logical volume is reaching an out-of-space condition by determining if the actual logical volume utilization of step 320 is greater than the logical volume utilization threshold of step 310. For example, if the logical volume utilization threshold is set at "80%, and if a logical volume is configured to comprise 1 GB, then Applicants' method would consider the logical volume to be reaching the out-of-space condition if the actual storage usage of step 310 is 800 megabytes or greater. Although the above example provides a percentage of allocated space as the predetermined threshold value, it is to be appreciated that the predetermined threshold value could, for example, be an amount of allocated space or any other indication of an out-of-space condition.

If the method determines in step 330 that the actual storage usage of step 310 is not greater than the threshold volume usage of step 305, then the method continues monitoring the logical volume. Alternatively, the method determines in step 320 that the actual logical volume utilization of step 320 is greater than the logical volume utilization threshold of step 310, the method transitions to step 340 and determines if configured, physical storage space is available. In certain embodiments, by "configured physical space" Applicants mean storage space that has been configured to utilize a RAID data storage protocol.

In certain embodiments, step 340 is performed by a storage services provider. In certain embodiments, step 340 is performed by a storage controller, such as storage controller 100 (FIG. 1) or storage controller 240 (FIG. 2). In certain embodiments, step 340 is performed by a host computer in communication with the logical storage volume.

If the method determines in step 340 that configured physical space is available, then the method transitions from step 340 to step 350 wherein the method reconfigures the logical volume of step 305 to include all or a portion of the additional available configured physical space. In certain embodiments, step 350 is performed by a storage services provider. In certain embodiments, step 350 is performed by a storage controller, such as storage controller 100 (FIG. 1) or storage controller 240 (FIG. 2). In certain embodiments, step 350 is performed by a host computer in communication with the logical storage volume. The method transitions from step 350 to step 320 and continues as described herein.

Alternatively, if the method determines in step 340 that no available configured physical space exists then, in step 360 Applicants' method determines if non-configured physical space is available. In certain embodiments, step 360 comprises providing a query from a host computer to a storage controller external to said host computer. In certain embodiments, step 360 is performed by a storage services provider. In certain embodiments, step 360 is performed by a storage controller, such as storage controller 100 (FIG. 1) or storage controller 240 (FIG. 2). In certain embodiments, step 350 is performed by a host computer in communication with the logical storage volume.

If the method determines in step 360 that physical storage space exists which can be appropriately configured (e.g., configured according to the RAID 5 protocol), then the method transitions from step 360 to step 370 and configures this physical space. In certain embodiments, step 370 is performed by a storage services provider. In certain embodiments, step 370 is performed by a storage controller, such as storage controller 100 (FIG. 1) or storage controller 240 (FIG. 2). In certain embodiments, step 370 is performed by a host computer in communication with the logical storage volume. The method transitions from step 370 to step 350 and continues as described herein.

If the method determines in step 360 that available storage space cannot be found, the method transitions from step 360 to step 380 wherein the method provides a message that a physical storage limit is met. In certain embodiments, step 370 is performed by a storage controller, such as storage controller 100 (FIG. 1) or storage controller 240 (FIG. 2). In certain embodiments, step 370 is performed by a host computer in communication with the logical storage volume.

In step 390, the method provides additional physical storage space. In certain embodiments, step 390 comprises detecting additional physical storage space. In certain embodiments, step 390 is performed by a storage services provider. In certain embodiments, step 390 is performed by a storage controller, such as storage controller 100 (FIG. 1) or storage controller 240 (FIG. 2). In certain embodiments, step 390 is performed by a host computer in communication with the logical storage volume. The method transitions from step 390 to step 330 and continues as described herein.

Preferably, steps 310-380 (FIG. 3) are executed using a storage subsystem controller, such as storage controller portion 130, 140 including processor 132, 142. The storage system also comprises a computer readable medium, such as computer readable medium 133 (FIGS. 1, 2) and/or 143 (FIG. 1). A computer readable program code is encoded in the computer readable medium 133, 143, the computer readable program code 242 encoded in the computer readable medium, wherein that computer readable program code can be used by processor 132 (FIGS. 1, 2) and/or 142 (FIG. 1) to perform one or more of steps 310, 320, 330, 340, 350, 360, 370, 380, and/or 390, recited in FIG. 3. In certain embodiments, computer readable medium 133 and/or 143 comprises, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to reconfigure a logical volume, comprising:
   determining if utilization of said logical storage volume is nearing capacity;
   operative if utilization of said logical storage volume is nearing capacity, determining if configured physical storage space is available;
   operative if configured physical storage space is available, reconfiguring said logical storage volume using all or a portion of said configured physical space;
   establishing a logical volume utilization threshold;
   determining an actual logical volume utilization;
   operative if said actual logical volume utilization is greater than said logical volume utilization threshold, determining that said logical storage volume is nearing capacity.

2. The method of claim 1, wherein said logical volume utilization threshold comprises a predetermined percentage of a configured storage capacity of said logical volume.

3. The method of claim 1, further comprising:
   operative if configured physical storage space is not available, determining if non-configured physical storage space is available;
   operative if non-configured physical storage space is available, configuring said available physical storage space.

4. The method of claim 3, wherein said determining if non-configured physical space is available comprises providing a query to said storage controller from said host computer.

5. The method of claim 3, further comprising operative if non-configured physical storage space is not available, providing notice that physical storage space limitation is reached.

6. The method of claim 5, further comprising providing additional physical storage space.

7. A storage controller comprising a computer readable medium comprising computer readable program code encoded therein to reconfigure a logical storage volume, the computer readable program code comprising a series of computer readable program steps to effect:
- determining if utilization of said logical storage volume is nearing capacity;
- operative if utilization of said logical storage volume is nearing capacity, determining if configured physical storage space is available;
- operative if configured physical storage space is available, reconfiguring said logical storage volume using all or a portion of said configured physical space;
- wherein the computer readable program code to determine if a storage capacity of the logical storage volume is nearing capacity further comprises a series of computer readable program steps to effect:
- establishing a logical volume utilization threshold;
- determining an actual logical volume utilization;
- operative if said actual logical volume utilization is greater than said logical volume utilization threshold, determining that said logical storage volume is nearing capacity.

8. The storage controller of claim 7, wherein said logical volume utilization threshold comprises a predetermined percentage of a configured storage capacity of said logical volume.

9. The storage controller of claim 7, said computer readable program code further comprising a series of computer readable program steps to effect:
- operative if configured physical storage space is not available, determining if non-configured physical space is available;
- operative if non-configured physical space is available, configuring said available physical space.

10. The storage controller of claim 9, wherein said computer readable program code to determine if non-configured physical space is available further comprising a series of computer readable program steps to effect receiving a query from a host computer.

11. The storage controller of claim 9, wherein non-configured physical space is not available, said computer readable program code further comprising a series of computer readable program steps to effect providing notification to a host computer that a physical storage limit is met.

12. The storage controller of claim 11, said computer readable program code further comprising a series of computer readable program steps to effect:
- detecting newly-added physical storage space;
- configuring said detected physical storage space;
- reconfiguring said logical volume to include the detected and configured physical storage space.

13. A computer program product encoded in a computer readable medium and useable with a programmable computer processor to reconfigure a logical storage volume, the computer program product comprising:
- computer readable program code which causes said programmable processor to determine if a storage capacity of said logical storage volume is nearing capacity;
- computer readable program code which, if said storage capacity of the logical storage volume is nearing capacity, causes said programmable processor to determine if configured physical storage space is available;
- computer readable program code which, if configured physical storage space is available, causes said programmable processor to re-configure said logical volume to include all or a portion of said configured physical space;
- wherein the computer readable program code to determine if a storage capacity of the logical storage volume is nearing capacity further comprises:
- computer readable program code which causes said programmable processor to retrieve a pre-determined logical volume utilization threshold;
- computer readable program code which causes said programmable processor to determine an actual logical volume utilization;
- computer readable program code which, if said actual logical volume utilization is greater than said logical volume utilization threshold, causes said programmable processor to determine if configured physical storage space is available.

14. The computer program product of claim 13, wherein said computer readable program code to determine if non-configured physical space is available further comprises computer readable program code which causes said programmable processor to receive a query from a host computer.

15. The computer program product of claim 13, said computer readable program code further comprising a series of computer readable program steps to effect:
- computer readable program code which, if configured physical storage space is not available, causes said programmable processor to determine if non-configured physical space is available;
- computer readable program code which, if non-configured physical space is available, causes said programmable processor to configure said available physical space.

16. The computer program product of claim 15, wherein non-configured physical space is not available, and wherein said article of manufacture is in communication with a host computer, further comprising computer readable program code which causes said programmable processor to provide notification to said host computer that a physical storage limit is reached.

17. The computer program product of claim 16, further comprising:
- computer readable program code which causes said programmable processor to detect additional physical storage space;
- computer readable program code which causes said programmable processor to configure said detected physical space;
- computer readable program code which causes said programmable processor to re-configure said logical volume to include said detected and configured physical space.

* * * * *